W. C. HICKS.
BREECH LOADING FIREARM.
No. 1,952. Reissued May 9, 1865.
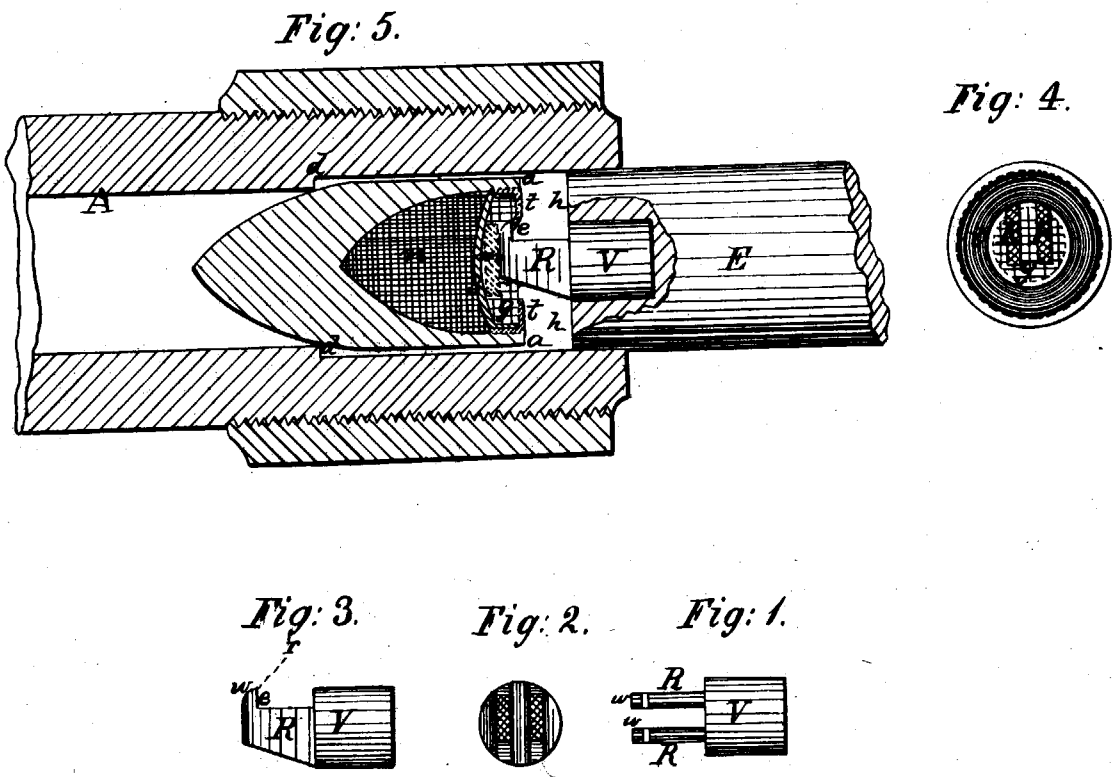
Witnesses:
J. L. Coombs
Jno. D. Patten
Inventor:
Wm Cleveland Hicks
By J. L. Coombs
Attorney
THE NORRIS PETERS CO., PHOTO-LITHO., WASHINGTON, D. C.

UNITED STATES PATENT OFFICE.

WILLIAM CLEVELAND HICKS, OF NEW YORK, N. Y.

IMPROVEMENT IN BREECH-LOADING FIRE-ARMS.

Specification forming part of Letters Patent No. 16,797, dated March 10, 1857; Reissue No. 1,952, dated May 9, 1865.

*To all whom it may concern:*

Be it known that I, WILLIAM CLEVELAND HICKS, late of New Haven, in the county of New Haven and State of Connecticut, but now of New York, in the county and State of New York, have invented certain new and useful Improvements in Fire-Arms; and I hereby declare that the following is a full, clear, and exact description of the same, reference being had to the accompanying drawings, in which—

Figures 1, 2, 3, 4, and 5 represent on an enlarged scale several views of those parts of a fire-arm to which my improvements are applied, Figs. 4 and 5 showing, in addition to the said parts, a sectional view and rear elevation of a cartridge.

My invention relates to breech-loading fire-arms in which a breech-pin having a reciprocating motion to and from the barrel is used for closing the breech; and the object of this invention is the withdrawal from the barrel of accidentally or otherwise not exploded cartridges, or the cases thereof, and if primed cartridges be used its further object is to give more certainty to the action of the hammer, and thus insure the explosion of the charge; and my invention consists, first, in combining, in a breech-loading fire-arm, with an internally-flanged cartridge or cartridge-case, a hooked or barbed instrument, or the equivalent thereof, under such an arrangement in relation to an outside lever operating the breech as that by opening the breech the cartridge or its case is withdrawn from the barrel; secondly, in the employment, in breech-loading fire-arms, of a breech-piece provided with a hooked prong or prongs, when said prongs are constructed, as hereinafter more fully explained, to perform the functions of pricking the cartridge and striking the percussion-primer, and of grasping and extracting the cartridge or its shell from the barrel, as set forth; thirdly, in the employment, in breech-loading fire-arms in which primed cartridges are used and exploded by means of the breech-pin, of two or more prongs to insure the explosion of the charge.

From the above statement it will appear that my invention may be applied to fire-arms of any known or suitable construction, whether a single-shooter, revolver, or repeater, in which the charge in introduced at the breech, and the rear end of the barrel closed by a breech-piece moving to and from the barrel; and it may be used in connection with primed cartridges—*i. e.*, cartridges in which the fulminate or percussion is contained. In such fire-arms, partly owing to the construction of the cartridge and partly owing to the construction of the breech-pin, cartridges which by accident or otherwise remain unexploded in the barrel could only be withdrawn by pushing the same out of the breech of the barrel by means of a rod inserted at the muzzle. This mode of withdrawing cartridges is attended with much delay, inconvenience, and danger.

The object of the present improvements, which will now be more fully appreciated, therefore consists in obviating these delays, inconveniences, and dangers, also in rendering the arms more sure to fire.

The manner in which my said invention is or may be carried into effect is as follows: I construct the breech-pin K (represented in plan, front, and side view in Figs. 1, 2, and 3, respectively,) in one piece, with two prongs, *a*, projecting on its forward end. They may be formed by milling or sawing a slit into the round rod *v* from *a* to *b*, Fig. 1, and milling or filing off the exterior rounding surface from *a* to *c*, Fig. 1, leaving the sides of said projections flat and perfectly parallel to each other. The under sides of these prongs are milled or filed on a slight angle from *x* to *z*, Fig. 3, to allow the cartridge to be thrown off more easily. The upper edges, from *e* to *k*, Fig. 3, are filed lower than the top of the round rod *v*, and the front of the nipple, at *w*, is formed into hooks, the upper angle of which is filed away to form a bevel face, as shown at *w*, Fig. 3, for the purpose of pressing more gradually against the brass of the percussion-cap.

The cartridge designed to be used in this my improved breech-loading fire-arm is shown in Figs. 4 and 5. The former is a rear view of the same, showing the blunt end of a ball primed and leaded with powder, the latter an axial section of the cartridge in position in the barrel and with the breech-pin closed. The cartridge is partially closed in rear by a cap, *t*, composed of a brass case with a circular hole in its center, through which projects slightly a cork, *g*, which forms an elastic protecting-cushion to the percussion-cake *m*, located between it and a steel disk, *p*, which, in its turn, rests firmly on the powder *n*. The prongs are attached to the breech-pin K by driving the rod V into a hole in the end of the breech-pin. The breech-pin is represented as broken open to expose the rod and its position. In Fig. 5 the breech-pin K is represented as closing the breech of the gun and barrel—the hooked prongs, it will be seen, after having penetrated the cork and indented the rim of brass on the edge of the circular hole in the cap just enough to allow the hooks of the prongs to pass by the flange to the primer. A blow upon the end T of the breech-pin K will now (provided all things are properly adjusted) explode the percussion-cake *m*, set fire to the powder *n*, and discharge the ball from the gun; but, as often happens, if the ball should be imperfect, or for any other cause the gun should fail to fire, and we commence moving the breech-pin back from the gun, the hooks of the nipples *a a w w* catch hold of the brass rim bent inward, as shown at *t*, and hang so firmly that the cartridge is drawn out with it, cleaning the arm for another charge, which is instantly placed in position by the motion of a lever.

In using a single prong to explode the percussion the arm is more liable to fail than when the double prongs are used, as the percussion-cake often lies away from the center, and also often breaks into two parts, allowing the prong to pass to the disk, leaving the percussion on the sides untouched; but the double prongs are sure to strike some of the percussion matter to fire, and, instead of pushing it away, collect it between the prongs, thereby insuring the discharge of the gun.

More than two prongs might, under some circumstances, be used advantageously, particularly in large guns, as the chances of the loaded balls or cartridges to miss fire decrease as the prongs are increased.

Having thus fully described the nature of my said invention and the manner in which the same is or may be carried into effect, I claim—

1. The combination, in a breech-loading fire-arm, with an internally-flanged cartridge or cartridge-case, of a hooked or barbed instrument under such an arrangement, in relation to an outside lever operating the breech, as that by opening the breech the cartridge or its case is withdrawn from the barrel.

2. The employment, in breech-loading fire-arms, of a breech-piece provided with a hooked prong or prongs, when said prongs are constructed, as herein described, to perform the functions of pricking the cartridge and striking the percussion-primer, and of grasping and extracting the cartridge or its shell from the barrel, as set forth.

3. The employment, in breech-loading fire-arms in which primed cartridges are used and exploded by means of the breech-pin, of two or more prongs to insure the explosion of the charge, substantially as set forth.

In testimony whereof I have signed my name to this specification before two subscribing witnesses.

WM. CLEVELAND HICKS.

Witnesses:
WILLARD I. NICHOLS,
GEORGE W. SEAMAN.